United States Patent
Ikeda et al.

(10) Patent No.: US 7,779,187 B2
(45) Date of Patent: Aug. 17, 2010

(54) DATA COMMUNICATION CIRCUIT AND ARBITRATION METHOD

(75) Inventors: Junichi Ikeda, Miyagi (JP); Noriyuki Terao, Miyagi (JP); Koji Oshikiri, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 91 days.

(21) Appl. No.: 11/682,007

(22) Filed: Mar. 5, 2007

(65) Prior Publication Data

US 2007/0220193 A1    Sep. 20, 2007

(30) Foreign Application Priority Data

Mar. 17, 2006  (JP)  .............................. 2006-075018

(51) Int. Cl.
  *G06F 13/00*  (2006.01)
(52) U.S. Cl. .................. 710/111; 710/309; 710/310
(58) Field of Classification Search ................. 710/107, 710/111, 113, 117, 124, 306, 309, 311, 314, 710/315, 240–244
  See application file for complete search history.

(56) References Cited

U.S. PATENT DOCUMENTS

| | | | |
|---|---|---|---|
| 5,901,332 A | 5/1999 | Gephardt et al. | |
| 6,064,678 A * | 5/2000 | Sindhushayana et al. | 370/470 |
| 6,128,316 A * | 10/2000 | Takeda et al. | 370/468 |
| 6,389,480 B1 * | 5/2002 | Kotzur et al. | 709/249 |
| 6,438,135 B1 * | 8/2002 | Tzeng | 370/412 |
| 6,470,016 B1 | 10/2002 | Kalkunte et al. | |
| 6,754,215 B1 * | 6/2004 | Arikawa et al. | 370/395.4 |
| 6,888,842 B1 * | 5/2005 | Kirkby et al. | 370/414 |
| 6,981,052 B1 * | 12/2005 | Cheriton | 709/232 |
| 6,996,099 B1 * | 2/2006 | Kadambi et al. | 370/389 |
| 7,016,302 B1 * | 3/2006 | Schramm et al. | 370/235 |
| 7,110,359 B1 * | 9/2006 | Acharya | 370/235 |
| 7,289,515 B2 * | 10/2007 | Kusumoto | 370/395.41 |
| 7,406,098 B2 * | 7/2008 | Taneja et al. | 370/468 |
| 7,433,984 B2 * | 10/2008 | Das et al. | 710/117 |
| 2003/0202517 A1 * | 10/2003 | Kobayakawa et al. | 370/395.4 |
| 2005/0002371 A1 * | 1/2005 | Andersen | 370/346 |
| 2005/0038947 A1 | 2/2005 | Lueck et al. | |
| 2005/0122982 A1 * | 6/2005 | Li et al. | 370/395.41 |
| 2005/0248584 A1 | 11/2005 | Takeo et al. | |

(Continued)

FOREIGN PATENT DOCUMENTS

EP    1 545 090 A1    6/2005

(Continued)

OTHER PUBLICATIONS

Managing Performance Using Weighted Round-Robin, Wang et al., IEEE, 2000.*

(Continued)

*Primary Examiner*—Khanh Dang
(74) *Attorney, Agent, or Firm*—Oblon, Spivak, McClelland, Maier & Neustadt, L.L.P.

(57) ABSTRACT

A statistical-information generating unit monitors packet data output from a transaction layer that constitutes architecture of a PCI Express. The result of the monitored is feedback-controlled to a weight-information updating unit in real time, and is reflected in an arbitration table. A priority is set to the packet data corresponding to a quantity of the packet data actually transferred on a serial communication path.

17 Claims, 14 Drawing Sheets

U.S. PATENT DOCUMENTS

| | | |
|---|---|---|
| 2005/0254085 A1 | 11/2005 | Oshikiri et al. |
| 2006/0101178 A1* | 5/2006 | Zhong et al. ................ 710/112 |
| 2006/0114918 A1* | 6/2006 | Ikeda et al. ................. 370/408 |
| 2006/0136639 A1* | 6/2006 | Futral et al. ................ 710/244 |
| 2006/0146864 A1* | 7/2006 | Rosenbluth et al. ......... 370/458 |
| 2006/0171300 A1 | 8/2006 | Oshikiri et al. |
| 2006/0173986 A1 | 8/2006 | Ikeda et al. |
| 2006/0187944 A1 | 8/2006 | Takeo et al. |
| 2006/0209722 A1 | 9/2006 | Takeo et al. |
| 2006/0227143 A1 | 10/2006 | Maita et al. |
| 2007/0070901 A1* | 3/2007 | Aloni et al. ................. 370/230 |

FOREIGN PATENT DOCUMENTS

| | | |
|---|---|---|
| JP | 2001-16382 | 1/2001 |
| JP | 2006-92286 | 4/2006 |
| JP | 2006-99180 | 4/2006 |
| WO | WO 2004/004275 A1 | 1/2004 |

OTHER PUBLICATIONS

Jo Woon Chong, et al., "QoS-Based AAL2/ATM Multiplexing Schemes in the UTRAN lub Interface", The 14$^{th}$ IEEE 2003 International Symposium on Personal, Indoor and Mobile Radio Communication Proceedings, vol. 2, XP-010677918, Sep. 7, 2003, pp. 2042-2046.

Houjin Li, et al., "Effective Bandwidths under Dynamic Weighted Round Robin Scheduling", IEEE Communications Society, Globecom 2004, vol. 2, XP-010757614, Nov. 29, 2004, pp. 665-669.

Chiung-Shien Wu, "Link-sharing method for ABR/UBR services in ATM networks", Computer Communications, vol. 21, No. 13, XP-004146573, Sep. 1, 1998, pp. 1131-1142.

U.S. Appl. No. 11/767,207, filed Jun. 22, 2007, Oshikiri, et al.

Takashi Satomi, "Outline of the PCI Express Standard", Interface, Chapter 4: The Standard of High Speed Extension Bus in Future, Jul. 2003, pp. 80-92 (with English Translation).

* cited by examiner

FIG. 14
BACKGROUND ART

| STATE | STATUS | TIME REQUIRED FOR RETURN OF L0 |
|---|---|---|
| L0 | ACTIVE (NORMAL) | |
| L0s | LINKED AT COMMON-MODE VOLTAGE CLOCK AND MAIN POWER SUPPLY ARE ON | 16ns TO 4$\mu$s |
| L1 | LINKED AT COMMON-MODE VOLTAGE CLOCK IS OFF, MAIN POWER SUPPLY IS ON | 1$\mu$s TO SEVERAL 10$\mu$s |
| L2 | CLOCK AND MAIN POWER SUPPLY ARE OFF AUXILIARY POWER SUPPLY (VAUX) IS SUPPLIED WHEN AVAILABLE | DEPEND ON SYSTEM |

RETURN TIME FROM L2 DEPENDS ON RISE TIME OF POWER SUPPLY AND PLL

DATA COMMUNICATION CIRCUIT AND ARBITRATION METHOD

CROSS-REFERENCE TO RELATED APPLICATIONS

The present document incorporates by reference the entire contents of Japanese priority document, 2006-075018 filed in Japan on Mar. 17, 2006.

BACKGROUND OF THE INVENTION

1. Field of the Invention

The present invention relates to a data communication circuit and an arbitration method for inputting plural pieces of data becoming a master of communications via one virtual channel in a high-speed serial bus, arbitrating the pieces of input data by an arbiter following an arbitration table, and outputting the arbitrated data to the high-speed serial bus.

2. Description of the Related Art

In general, a parallel-system bus as represented by protocol control information (PCI) and the like is used for an interface between devices, in an information processing apparatus such as a digital copying machine and a multi function peripheral (MFP) that handle image data and other data. However, the parallel-system bus has a problem in racing and skew. Because a transfer rate has become low, recently, the use of a high-speed serial interface such as the Institute of Electrical and Electronics Engineers (IEEE) 1394 and a universal serial bus (USB) in a high-speed and high image-quality image forming apparatus has been studied, in place of the parallel-system interface such as the PCI bus. For example, according to Japanese Patent Application Laid-open No. 2001-016382, the use of a high-speed serial interface such as the IEEE 1394 and the USB has been proposed as an internal interface.

As a method of separately transferring image data and command data on the high-speed serial interface, there is a method of using an Isochronous transfer mode and an asynchronous transfer mode defined by the IEEE 1394 standard or the USB standard.

However, according to the method of separating the traffic by using the Isochronous transfer mode and the asynchronous transfer mode, it is difficult to set a priority order of image data when there are plural pieces of image data.

As another high-speed serial interface, an interface called a PCI Express (Trademark) corresponding to a succession standard of the PCI bus system has been also proposed, and it is at the stage of practical use (for example, see "Outline of a PCI Express Standard", by Takashi Satomi, Interface, July 2003). The PCI Express system is schematically configured as a data communication network based on a tree structure of a root complex-switch (an optional hierarchy)-device as shown in FIG. 1 of "Outline of a PCI Express Standard".

This PCI Express standard includes a virtual channel function for transmitting packet data of plural traffics by using, in time division, a serial bus in a virtual channel unit, and an arbitration function for arbitrating the priority of issuing packet data for each virtual channel. When packet data of plural traffics having different priorities of data transfer are to be simultaneously transferred using the serial bus, a transfer rate can be adjusted.

More specifically, according to an algorithm of arbitration of a virtual channel based on the PCI Express standard, there are a Round Robin system for issuing packet data for each virtual channel VC in equal frequency, a Weighted Round Robin system for issuing packet data for each virtual channel VC in a weighted frequency following an optionally assignable table, and a Strict system for issuing packet data for each virtual channel VC in a fixed priority order. Priority of the packet data to be transferred on the serial bus can be adjusted in a transaction unit.

When plural devices are shared for one virtual channel VC to carry out a direct memory access (DMA) transfer, the arbitration function of the PCI Express standard cannot be used. Therefore, an arbiter according to the Round Robin or the Weighted Round Robin is provided in each device.

However, depending on a buffer of a transaction layer that constitutes architecture of the PCI Express and kinds of generated plural traffics, setting of an arbiter do not match priority of the actual traffic in some cases. This is because a transmission buffer is present in the transaction layer that constitutes the architecture of the PCI Express, and there is a possibility that the effect of arbitration by the arbiter is lost due to the transmission buffer.

SUMMARY OF THE INVENTION

It is an object of the present invention to at least partially solve the problems in the conventional technology.

According to an aspect of the present invention, a data communication circuit that receives data as a master of a plurality of communications via one virtual channel in a high-speed serial bus, and that arbitrates the data with an arbiter by using an arbitration table to obtain arbitrated data, and outputs the arbitrated data to the high-speed serial bus, includes a statistical-information generating unit that is provided on a serial communication path via a transaction layer constituting architecture of the high-speed serial bus, and that generates statistical information about a traffic based on a quantity of packet data transferred on the serial communication path; and a weight-information updating unit that updates weight information of the arbitration table based on the statistical information generated by the statistical-information generating unit.

According to another aspect of the present invention, an arbitration method to be realized on a data communication circuit that receives data as a master of a plurality of communications via one virtual channel in a high-speed serial bus, and that arbitrates the data with an arbiter by using an arbitration table to obtain arbitrated data, and outputs the arbitrated data to the high-speed serial bus, includes generating statistical information about a traffic based on a quantity of packet data transferred on a serial communication path via a transaction layer constituting architecture of the high-speed serial bus; and updating weight information of the arbitration table based on the statistical information generated at the generating.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 14 is a schematic for explaining a definition of a link state called L0/L0s/L1/L2;

DETAILED DESCRIPTION OF THE PREFERRED EMBODIMENTS

Exemplary embodiments according to the present invention are explained below in detail with reference to the accompanying drawings.

A first embodiment of the present invention is explained blow with reference to FIG. 1 to FIG. 16.

Outline of PCI Express Standard

In the first embodiment, a PCI Express (a registered trademark) as one of high-speed serial buses is used. The outline of the PCI Express as the premise of the first embodiment is explained by a partial extract from "Outline of a PCI Express Standard". The high-speed serial bus means an interface that can exchange data at a high speed (at or above 100 megabits per second) by serially transmitting data using one transmission path.

The PCI Express is a bus standardized as a standard expansion bus common to a computer in general as a succeeding standard of the PCI. The outline is that the PCI Express has characteristics of a low-voltage differential signal transmission, a communication channel independent of transmission and reception at point to point, a packeted split transaction, and high scalability due to a difference of link configuration.

Figure 1:
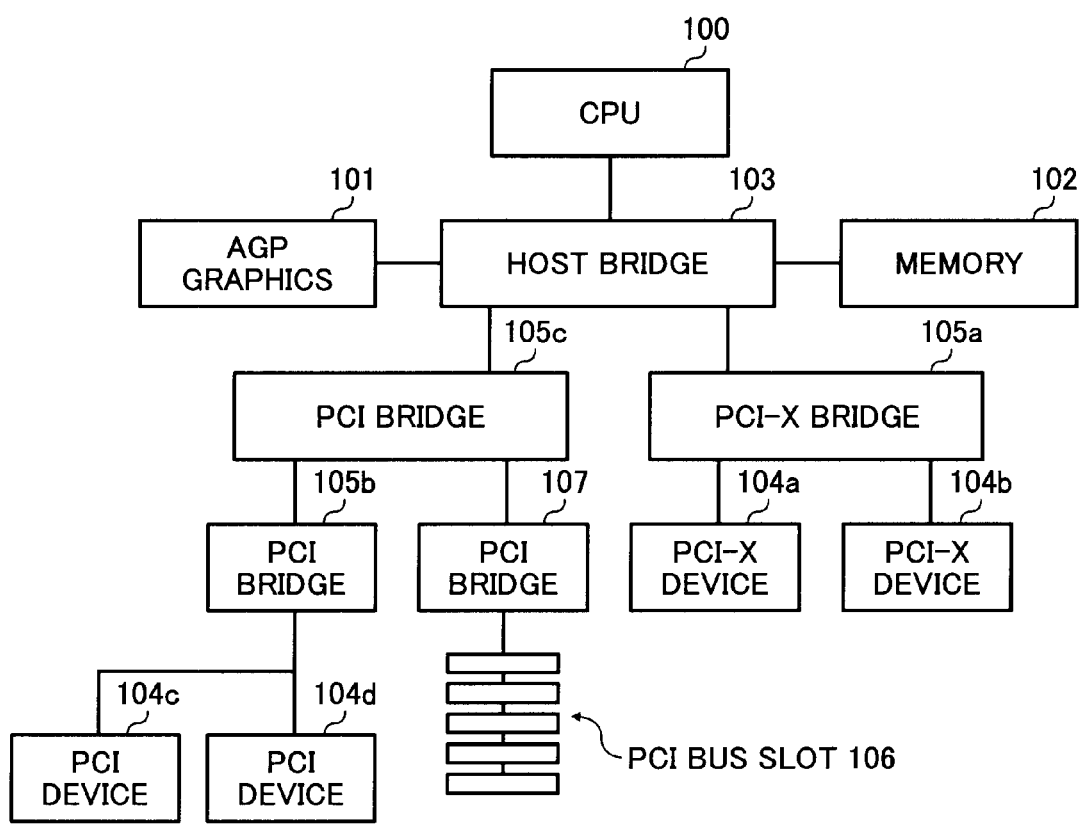
FIG. 1 is a block diagram of a configuration example of an existing PCI block.
Figure 2:
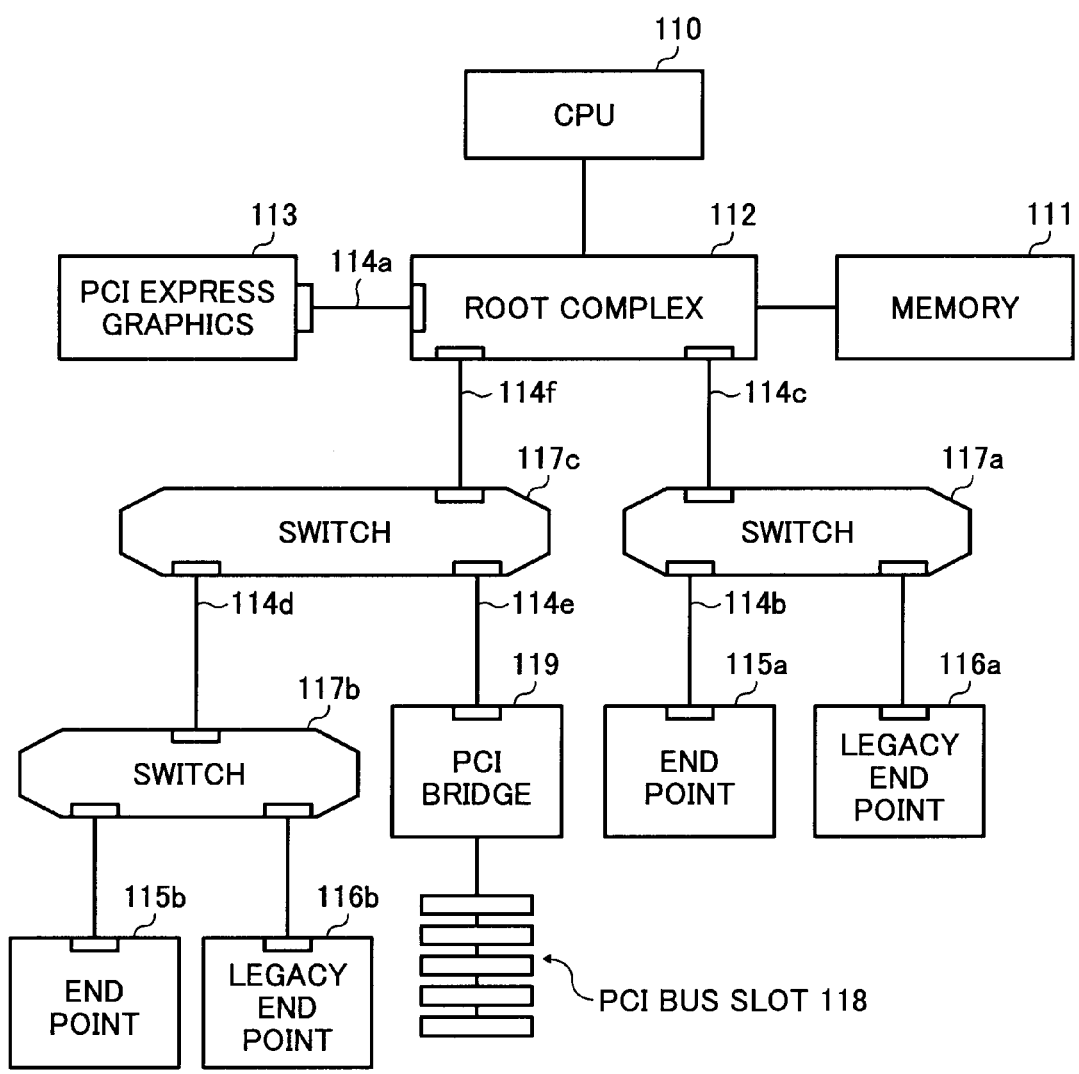
FIG. 2 is a block diagram of a configuration example of a PCI Express system.

FIG. 1 depicts an existing PCI system, and FIG. 2 is a configuration example of a PCI Express system. According to the existing PCI system, a central processing unit (CPU) 100, accelerated graphic port (AGP) graphics 101, and a memory 102 are connected to a host bridge 103, respectively. PCI-X (a higher compatible standard of the PCI) devices 104a and 104b are connected to the host bridge 103 via a PCI-X bridge 105a, respectively. PCI devices 104c and 104d are connected to a PCI bridge 105b, and a PCI bus slot 106 is connected to a PCI bridge 107. The PCI bridge 105b and the PCI bridge 107 are connected to the host bridge 103 via a PCI bridge 105c. The devices and the bridges are connected in a tree structure in this way.

On the other hand, according to the PCI Express system, a CPU 110 and a memory 111 are connected to a root complex 112. A PCI Express graphics 113 is connected to the root complex 112 via a PCI Express 114a. An end point 115a and a legacy end point 116a are connected to a switch 117a via a PCI Express 114b, and the switch 117a is connected to the root complex 112 via a PCI Express 114c. An end point 115b and a legacy end point 116b are connected to a switch 117b, and the switch 117b is connected to the switch via a PCI Express 114d. A PCI bus slot 118 is connected to a PCI bridge 119, and the PCI bridge 119 is connected to a switch 117c via a PCI Express 114e. The switch 117c is connected to the root complex 112 via a PCI Express 114f. The end points, the switches, etc. are connected in a tree structure in this way.

Figure 3:
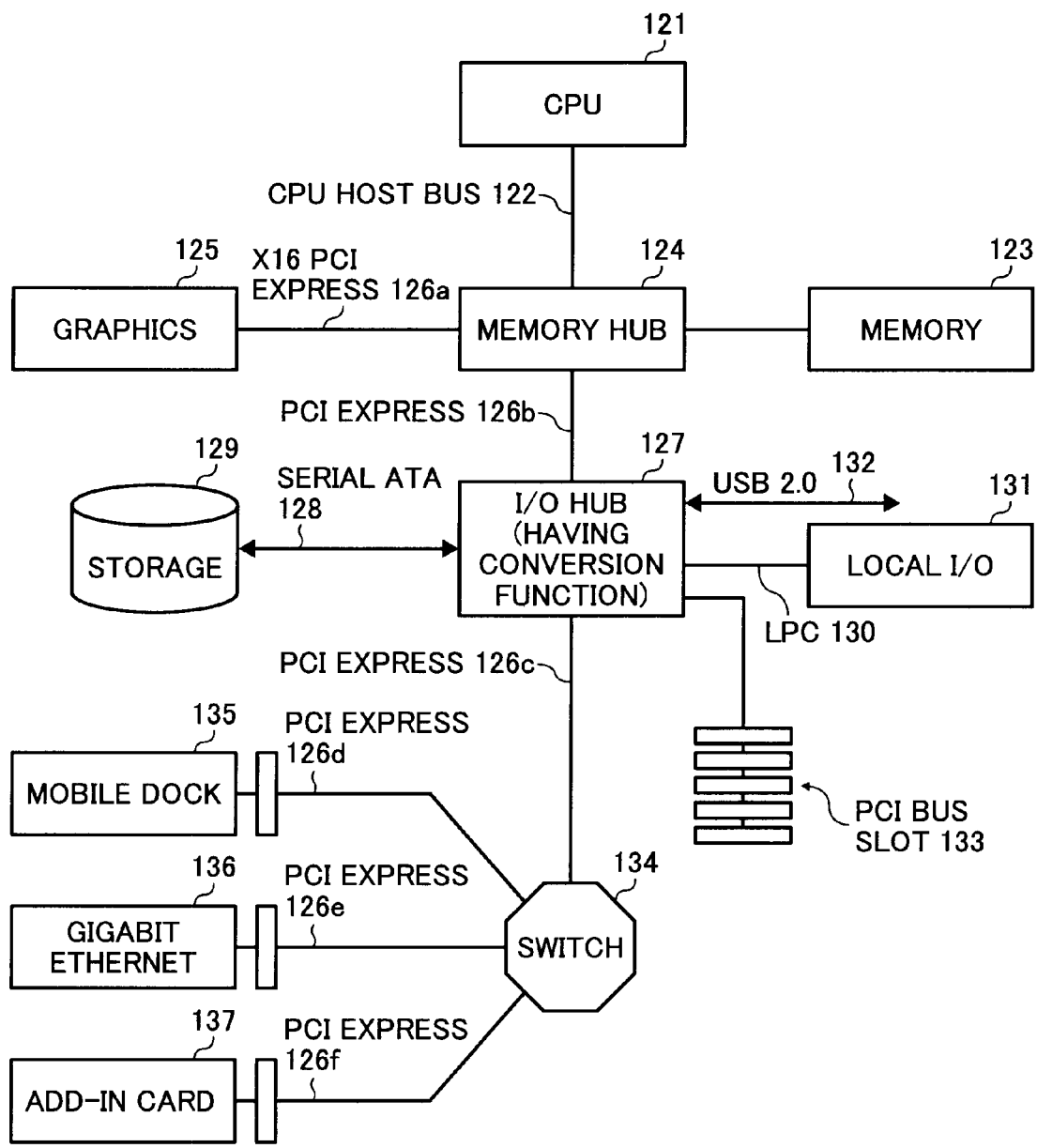
FIG. 3 is a block diagram of a configuration example of a PCI Express platform in a desktop/mobile unit.

An example of an actually assumed PCI Express platform is shown in FIG. 3. FIG. 3 is an example of the application to a desktop/mobile unit. A CPU 121 is connected to a memory hub 124 (corresponding to a root complex) via a CPU host bus 122, and a memory 123 is connected to the memory hub 124. A graphics 125 is connected to the memory hub 124 via an x16 PCI Express 126a. An input/output (I/O) hub 127 having a conversion function is connected to the memory hub 124 via a PCI Express 126b. A storage 129 is connected to the I/O hub 127 via a serial advanced technology attachment (serial ATA) 128, and a local I/O 131 is connected to the I/O hub 127 via an LPC 130. A USB 2.0 132 and a PCI bus slot 133 are connected to the I/O hub 127. Further, a switch 134 is connected to the I/O hub 127 via a PCI Express 126c. The switch 134 is connected to a mobile dock 135 via a PCI Express 126d, connected to a gigabit Ethernet 136 (where Ethernet is a registered trademark) via a PCI Express 126e, and connected to an add-in card 137 via a PCI Express 126f, respectively.

In other words, according to the PCI Express system, the conventional buses of PCI, PCI-X, and AGP are replaced by the PCI Express, and bridges are used to connect the existing PCI/PCI-X devices. Chip sets can be connected to each other by the PCI Expresses. The existing buses of the IEEE 1394, Serial ATA, USB 2.0 are connected to the PCI Express via the I/O hub.

Constituent Elements of PCI Express

A. Port/Lane/Link

Figure 4:
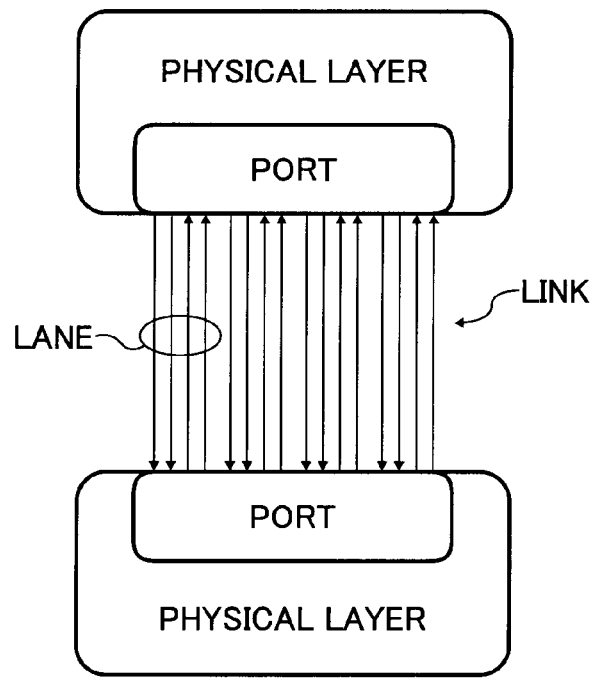
FIG. 4 is a schematic of a configuration example of a physical layer of x4.
Figure 5:
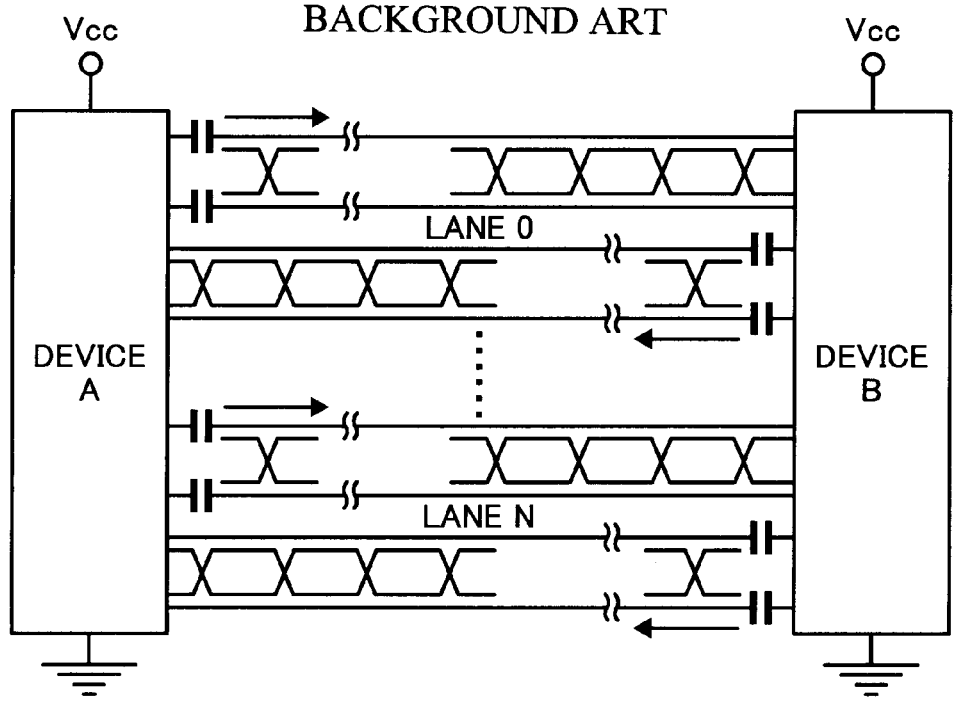
FIG. 5 is a schematic of a connection example of a lane between devices.

FIG. 4 depicts a configuration of a physical layer. A port is physically present in the same semiconductor, and is a group of transmitters/receivers forming a link. The port means an interface physically connecting between a component and a link at one to one (point to point). A transfer rate is set to 2.5 gigabits per second in a single direction, for example. A lane is a set of pairs of 0.8 volt differential signals, including a pair (two) of signals at a transmission side, and a pair (two) of signals at a reception side. A link is a group of lanes connecting between two ports, and is a dual simplex communication bus between components. An "xN link" includes N lanes. According to the current standard, N=1, 2, 4, 8, 16, 32 are defined. The example shown in FIG. 4 is an x4 link. For example, as shown in FIG. 5, a scalable band width can be configured, by changing the width N of the lanes that connect between devices A and B.

B. Root Complex

The root complex 112 is positioned at a highest level of the I/O structure, and connects the CPU and memory sub-systems to the I/O. In a block diagram, the root complex is described as a "memory hub" as shown in FIG. 3. The root complex 112 (or 124) has one or more PCI Express ports (root ports) (shown as squares in the root complex 112 in FIG. 2), and each port forms an independent I/O hierarchical domain. The I/O hierarchical domain is a simple end point (such as the end point 115a side in FIG. 2, for example), or is formed by many switches and end points (such as the end point 115b and the switches 117b and 117c sides).

C. End Point

The end point 115 is a device (specifically, a device other than a bridge) having a configuration space header of the type 00h, and is divided into a legacy end point and a PCI Express end point which are different as follows. The PCI Express end point is a base address register (BAR) requiring no I/O resource, and accordingly, requiring no I/O request. The PCI Express end point does not support a lock request.

D. Switch

Figure 6:
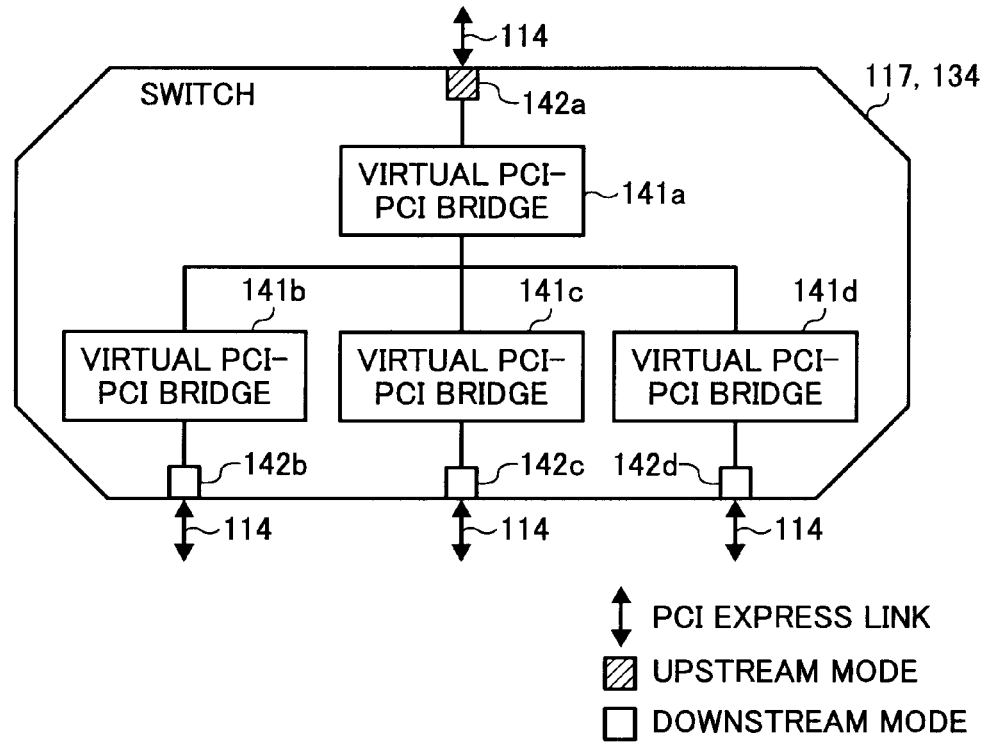
FIG. 6 is a block diagram of a logical configuration example of a switch.

The switch 117 (or 134) connects between two or more ports, and carries out a packet rooting between the ports. From configuration software, the switch is recognized as a group of virtual PCI-PCI bridges 141 (i.e., a virtual PCI-PCI bridge 141a, a virtual PCI-PCI bridge 141b, a virtual PCI-PCI bridge 141c, a virtual PCI-PCI bridge 141d), as shown in FIG. 6. In FIG. 6, double-arrowheads indicate Express links 114 (or 126). Reference numerals 142a to 142d denote ports. Among these ports, the port 142a is an upstream port near the root complex, and the ports 142b to 142d are downstream ports far from the root complex.

E. PCI Express 114e to the PCI bridge 119

A connection from the PCI Express to the PCI/PCI-X is provided. As a result, the existing PCI/PCI-X device can be used on the PCI Express system.

Hierarchical Architecture

Figure 7A:
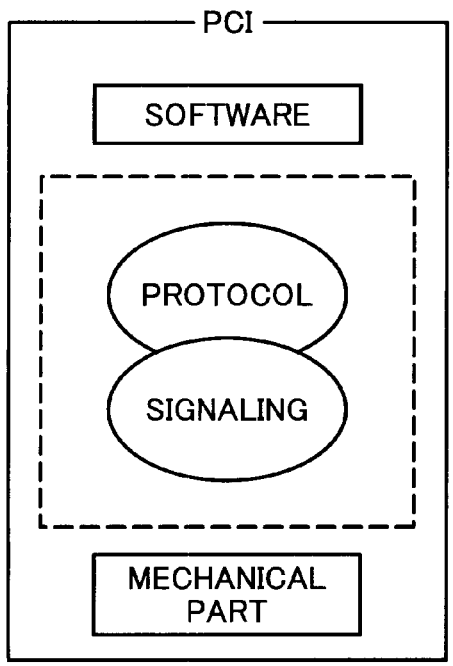
FIG. 7A is a block diagram of architecture of an existing PCI.
Figure 7B:
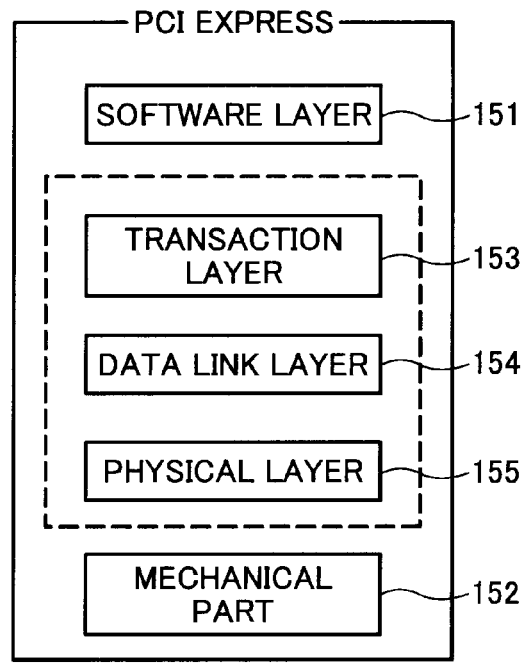
FIG. 7B is a block diagram of architecture of a PCI Express.

As shown in FIG. 7A, according to the conventional PCI architecture, the protocol and the signaling are closely related to each other, and there is no idea of hierarchy. However, according to the PCI Express, there is an independent hierarchical structure, like a general communication protocol and InfiniBand, and specification is defined for each hierarchy. In other words, the PCI Express has a transaction layer 153, a data link layer 154, and a physical layer 155 between highest-level software layer 151 and a lowest mechanical part 152. With this arrangement, module of each layer can be secured, and scalability can be provided, and the module can be used again. For example, when employing a new signal coding system or a transmission medium, data link layer and a transaction layer do not require a change, by simply changing the physical layer.

The transaction layer 153, the data link layer 154, and the physical layer 155 become the center of the PCI Express architecture. Each layer has the following roles explained with reference to FIG. 8.

A. Transaction Layer 153

Figure 9:
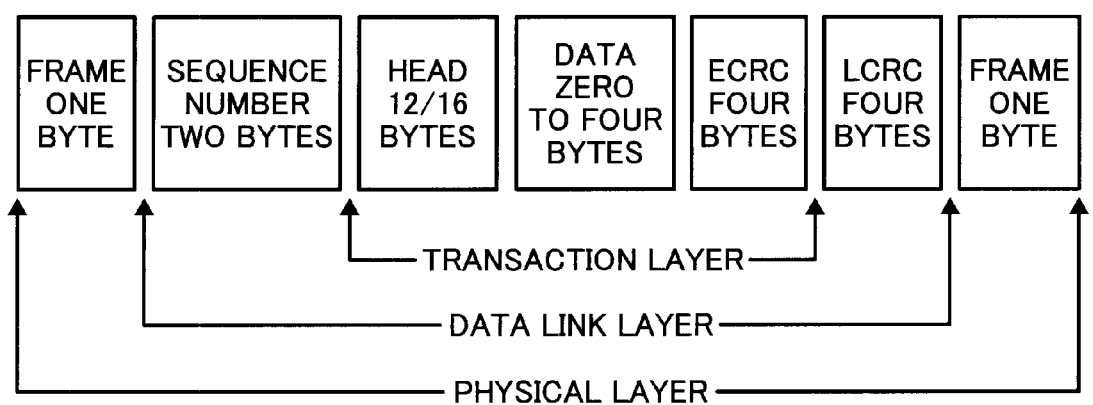
FIG. 9 is a schematic for explaining an example of a format of a transaction layer packet.

The transaction layer 153 is located at a highest position, and has a function of assembling and disassembling a transaction layer packet (TLP). The TLP is used to transmit transactions such as read/write and various kinds of events. The transaction layer 153 also carries out a flow control using credit for the TLP. The outline of the TLP is shown in FIG. 9. Details are described later.

B. Data Link Layer 154

A main role of the data link layer 154 is to guarantee the data completeness of the TLP by carrying out an error detection/correction (retransmission), and to perform a link management. A packet is exchanged between the data link layers 154, to perform link management and flow control. This packet is called a data link layer packet (DLLP) to distinguish this packet from the TLP.

C. Physical Layer 155

The physical layer 155 includes circuits such as a driver, an input buffer, a parallel-serial/serial-parallel converter, a phase-locked loop (PLL), and an impedance matching circuit that are necessary to carry out the interface operation. The physical layer 155 also has an interface initialization and maintenance function as a logical function. The physical layer 155 also has a role of making the data link layer 154 and the transaction layer 153 independent of a signal technique used in the actual link.

In the hardware configuration of the PCI Express, a technique called an embedded clock is employed. A clock signal is not present, and a clock timing is embedded in a data signal. A clock is extracted at a receiving side based on a cross point of the data signal.

Configuration Space

Figure 10:
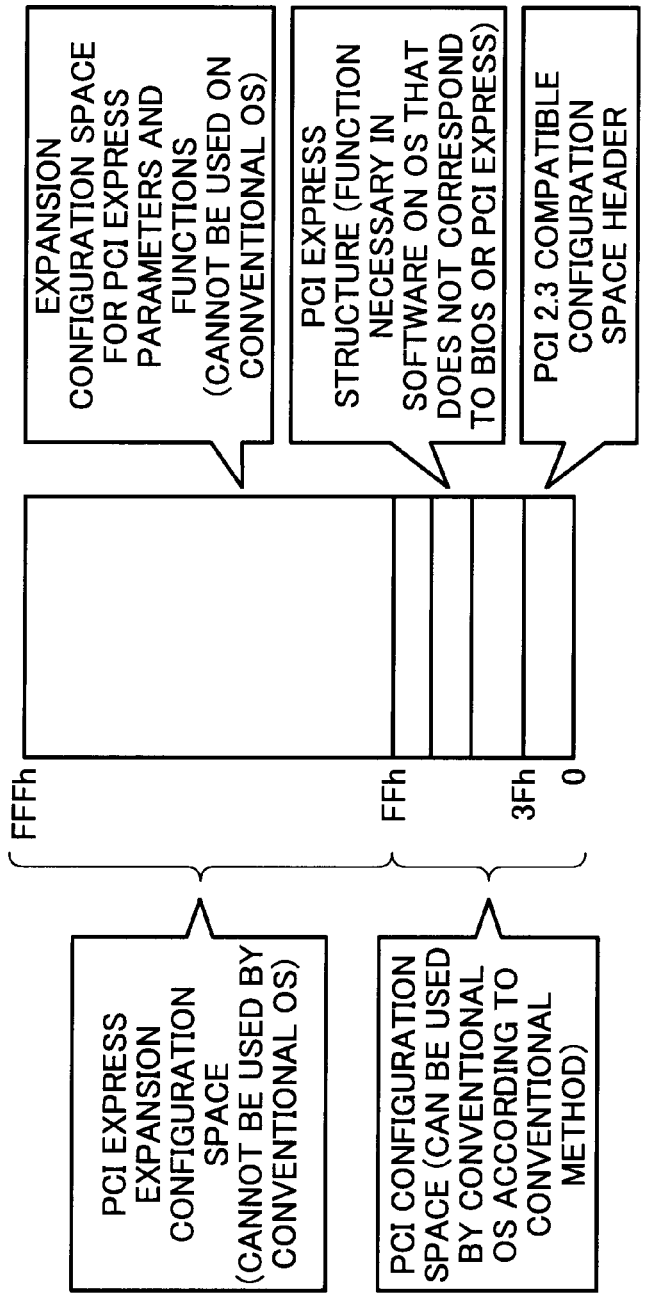
FIG. 10 is a schematic for explaining a configuration space of a PCI Express.

The PCI Express has a configuration space like the conventional PCI. While the size of the configuration space held by the conventional PCI is 256 bytes, the size of the configuration space held by the PCI Express is expanded to 4,096 bytes, as shown in FIG. 10. As a result, sufficiently large space is secured for the future, for devices (such as a host bridge) requiring many device-inherent registers. In the PCI Express, access to the configuration space is carried out by the access to a flat memory space (configuration read/write). Bus/device/function/register numbers are mapped in the memory address.

The header 256 bytes of the space can be accessed as PCI configuration space, by a method using the I/O port from the basic input/output system (BIOS) or a conventional operating system (OS). The function of converting the conventional access into the access of the PCI Express is mounted on the host bridge. The section from 00h to 3Fh is a PCI 2.3 compatible configuration header. As a result, functions other than those expanded by the PCI Express can directly use the conventional OS or software. In other words, the software layer in the PCI Express succeeds to load store architecture (a system that the processor directly accesses the I/O register) keeping compatibility with the existing PCI. However, to use a function expanded by the PCI Express (for example, functions of a synchronous transfer and Reliability, Availability and Serviceability (RAS)), it is necessary to be able to access a four-kilobyte PCI Express expansion space.

There are various form factors (shapes) of the PCI Express, and specific examples thereof are an add-in card, a plug-in card (Express Card), and a Mini PCI Express.

Details of Architecture of PCI Express

Each of the transaction layer 153, the data link layer 154, and the physical layer 155 that become the center of the architecture of the PCI Express is explained in detail.

A. Transaction Layer 153

A main role of the transaction layer 153 is to assemble and disassemble the TLP between the higher-level software layer 151 and the lower data link layer 154, as described above.

a. Address Space and Transaction Type

In the PCI Express, message space is added to the memory space (for data transfer to the memory space), the I/O space (for data transfer to the I/O space), and the configuration space (for device configuration and setup) that are supported by the conventional PCI. The message space is for an in-band event notification and a general message transmission (exchange) between the PCI Express devices. An interruption request and an acknowledgement are transmitted by using a message as a "virtual wire". Thus, four address spaces are defined. A transaction type is defined for each space (the memory space, the I/O space, and the configuration space are for read/write, and the message space is a basic (including a vender definition)).

b. Transaction Layer Packet (TLP)

The PCI Express carries out communications in a packet unit. In the format of the TLP shown in FIG. 9, a header length of the header is 3DW (where DW is an abbreviation of double word; total 12 bytes) or 4 DW (16 bytes). The transaction layer packet includes a format (a header length, and presence or absence of payload) of the TLP, a transaction type, a traffic class (TC), attributes, and payload length. A maximum payload length within the packet is 1,024 DW (4,096 bytes).

An end-to-end cyclic redundancy checksum (ECRC) guarantees data completeness of end to end, and is a 32-bit cyclic redundancy checksum (CRC) of the TLP. This is because when an error occurs in the TLP inside the switch, the error cannot be detected in the link CRC (LCRC).

Some requests require a complete packet, and other requests do not require a complete packet.

c. Traffic Class (TC) and Virtual Channel (VC)

Higher software can differentiate (prioritize) traffics by using a traffic class (TC). For example, it becomes possible to transfer image data with priority over the network data. There are eight TCs from TC0 to TC7.

Figure 11:
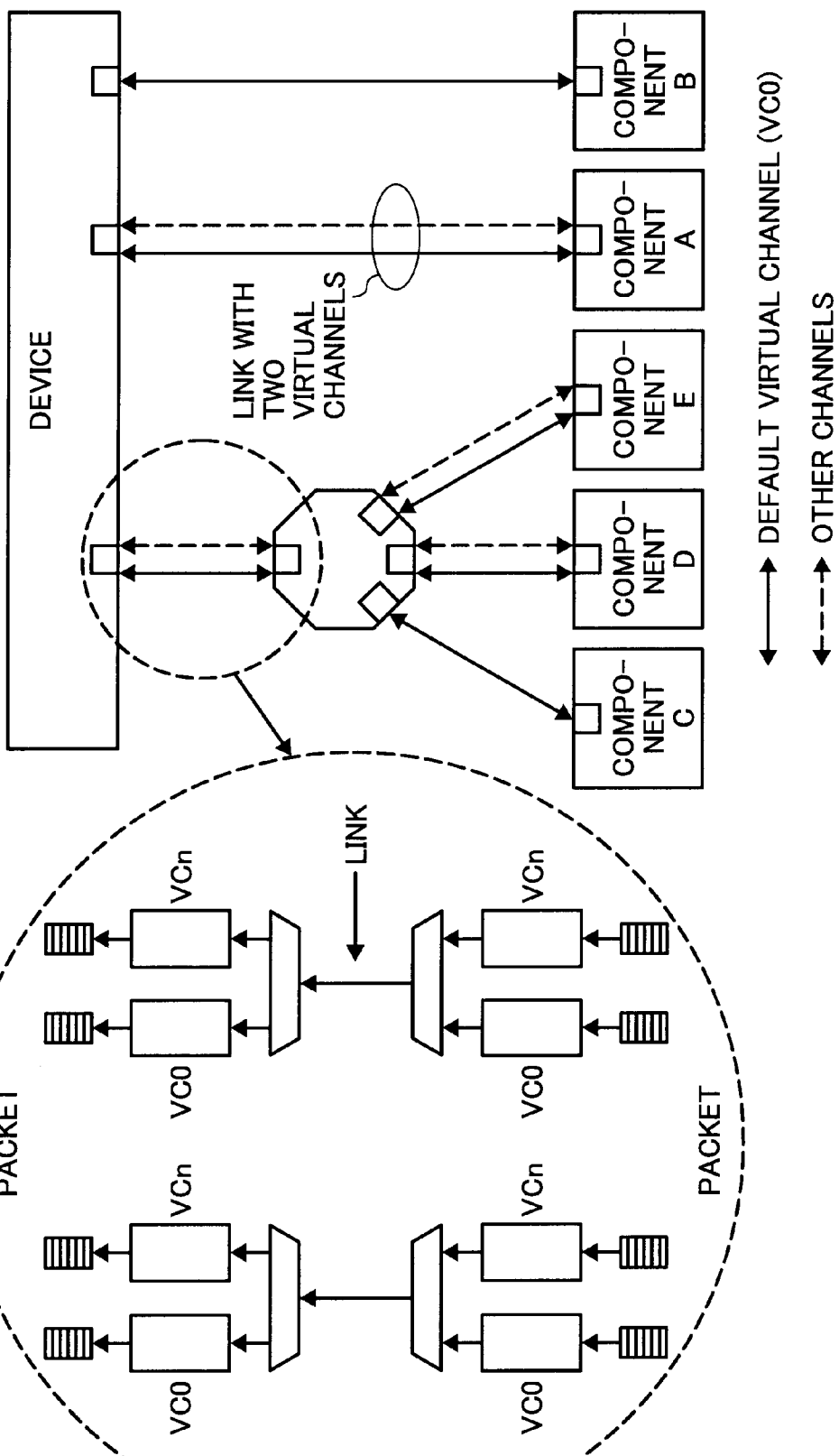
FIG. 11 is a schematic for explaining a concept of a virtual channel.

A virtual channel (VC) is an independent virtual communication bus (a mechanism using plural independent data flow buffers sharing the same link). Each virtual channel has resources (a buffer and a queue), and carries out independent flow control, as shown in FIG. 11. As a result, even when the buffer of one virtual channel is full, other virtual channel can be used to carry out a transfer. In other words, one link can be effectively used by dividing this link into virtual plural channels. For example, when a link of a root is divided into virtual plural channels to correspond to plural devices via the switch as shown in FIG. 11, priority of the traffic of each device can be controlled. VC0 is essential, and other virtual channels (VC1 to VC7) are mounted corresponding to the tradeoff of cost performance. In FIG. 11, solid line arrowheads show a default virtual channel (VC0), and broken-line arrowheads show other virtual channels (VC1 to VC7).

Within the transaction layer, TCs are mapped in VCs. One or plural TCs can be mapped in one VC, when the number of VCs is small. As a simple example, each TC can be mapped in each VC at one to one, and all TCs can be mapped in the virtual channel VC0. A mapping of TC0-VC0 is essential/fixed, and other mappings are controlled from higher software. The software can control priority of transactions by using TCs.

d. Flow Control

Flow control (FC) is carried out to establish a transmission order, by avoiding an overflow of a reception buffer. The FC is carried out at point to point between links, and is not carried out at end to end. Therefore, it cannot be acknowledged that a packet has reached an eventual destination (completer) by the FC.

The FC of the PCI Express is carried out on a credit base. Before starting a data transmission, a vacant state of a buffer at the reception side is confirmed, thereby avoiding the occurrence of overflow or underflow. In other words, a buffer capacity (a credit value) is transmitted from the reception side at the link initial time. The credit value is compared with a length of the transmission packet, at the transmission side. The packet is transmitted only when there is a constant remainder. There are six kinds of the credit.

Flow control information is exchanged using a DLLP of a data link layer. Flow control is applied to only the TLP, and is not applied to the DLLP. The DLLP can be always transmitted and received.

B. Data Link Layer 154

A main role of the data link layer 154 is to provide a highly reliable TLP exchange function between the two components on the link, as described above.

a. Handling of TLP

A two-byte sequence number is added to the header, and a four-byte LCRC is added to the tail, respectively, of the TLP received from the transaction layer 153. This TLP is delivered to the physical layer 155 (see FIG. 9). The TLP is stored in a retry buffer, and is retransmitted until when a reception acknowledgement (ACK) is received from the transmitter. When the transmission of the TLP is consecutively unsuccessful, it is determined that the link is abnormal, and a retraining of the link is requested to the physical layer 155. When the training of the link is unsuccessful, the state of the data link layer 154 shifts to inactive.

A sequence number and a LCRC of the TLP received from the physical layer 155 are checked. When the sequence number and the LCRC are normal, the TLP is delivered to the transaction layer 153. When there is an error, a retransmission is requested.

b. Data Link Layer Packet (DLLP)

Figure 12:
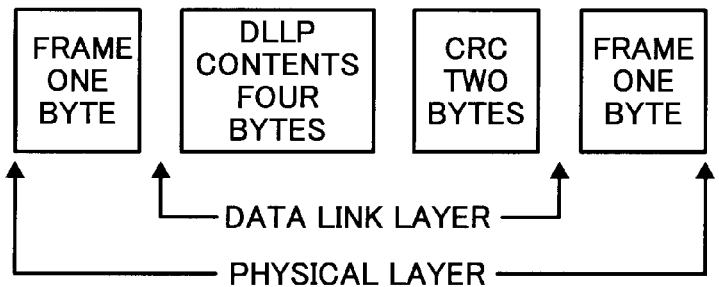
FIG. 12 is a schematic for explaining an example of a format of a data link layer packet.

The TLP is automatically divided into a DLLP as shown in FIG. 12 when transmitted from the physical layer, and is transmitted to each lane. A packet generated by the data link layer 154 is called a DLLP, and is exchanged between the data link layers 154. The DLLP includes the following types:

Ack/Nak: A reception acknowledgement of TLP, and retry (retransmission)

InitFC1/InitFC2/UpdateFC: Initialization and updating of flow control

DLLP for power supply management

As shown in FIG. 12, the DLLP has a length of six bytes, including a DLLP type (one byte) indicating a type, intrinsic information indicating a type of a DLLP (three bytes), and a CRC (two bytes).

C. Physical Layer-logical Sub-block 156

Figure 8:
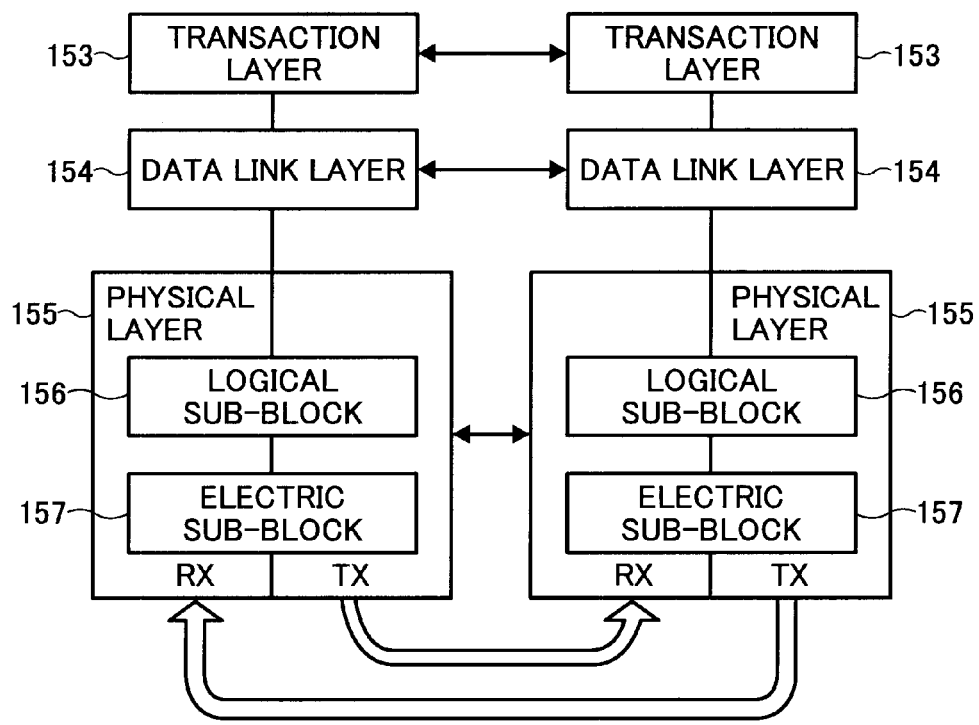
FIG. 8 is a block diagram of a hierarchical structure of a PCI Express.

A main role of a logical sub-block 156 of the physical layer 155 shown in FIG. 8 is to convert a packet received from the data link layer 154 into a format capable of being transmitted by an electric sub-block 157. The logical sub-block 156 also has a function of controlling/managing the physical layer 155.

a. Data Encoding and Parallel-serial Conversion

Figure 13:
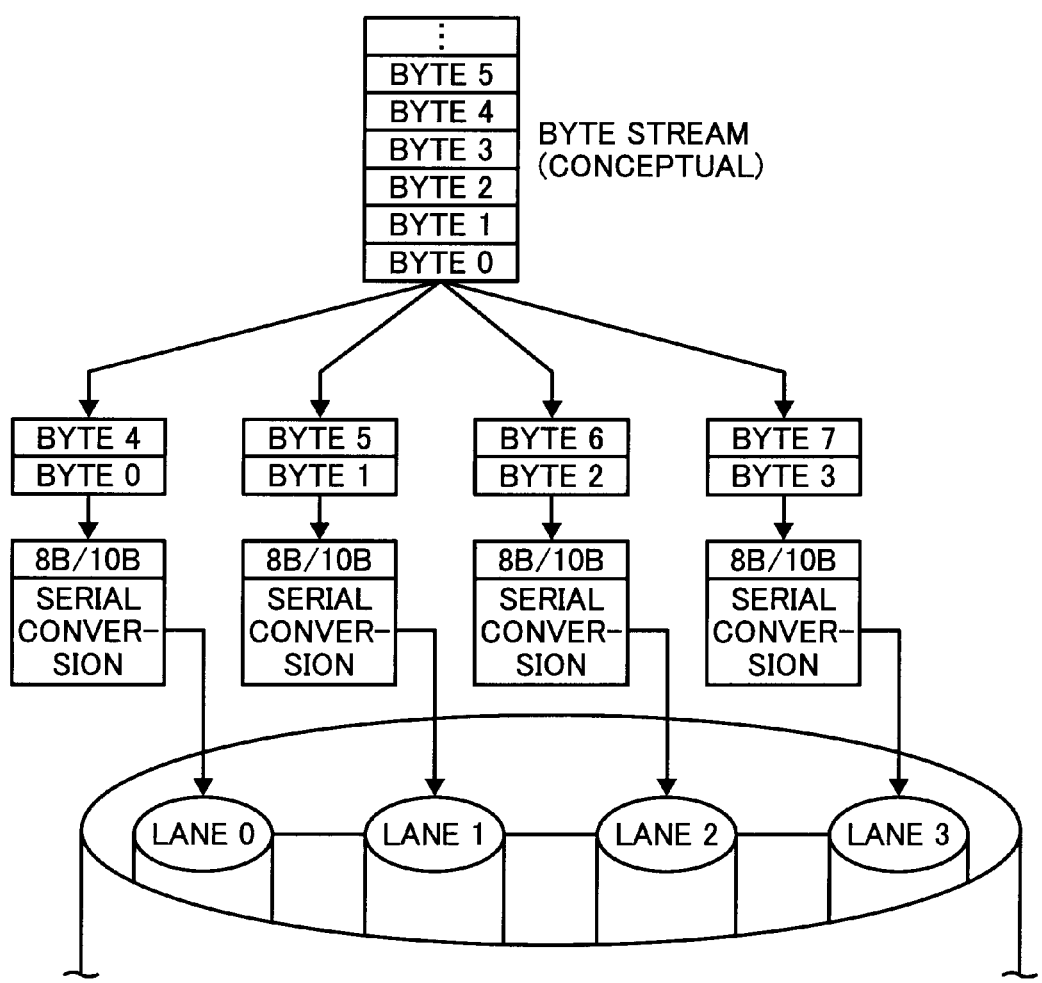
FIG. 13 is a schematic for explaining an example of a byte striping in an x4 link.

The PCI Express uses an 8 byte/10 byte conversion to carry out a data encoding to avoid a continuation of "0" or "1", that is, to avoid a state that a cross point is not present for a long time. The converted data is serially converted, and is transmitted to the lane from the LSB, as shown in FIG. 13. When plural lanes are present, data is allocated to each lane in byte unit before the encoding. FIG. 13 is an example of an x4 link. Although the bus looks like parallel buses, skew that becomes a problem in the parallel bus is substantially mitigated, because a transfer is carried out independent of each lane.

b. Power Supply Management and Link State

To suppress power consumption of the link at a low level, a link state called L0/L0s/L1/L2 is defined as shown in FIG. 14.

Figure 15:
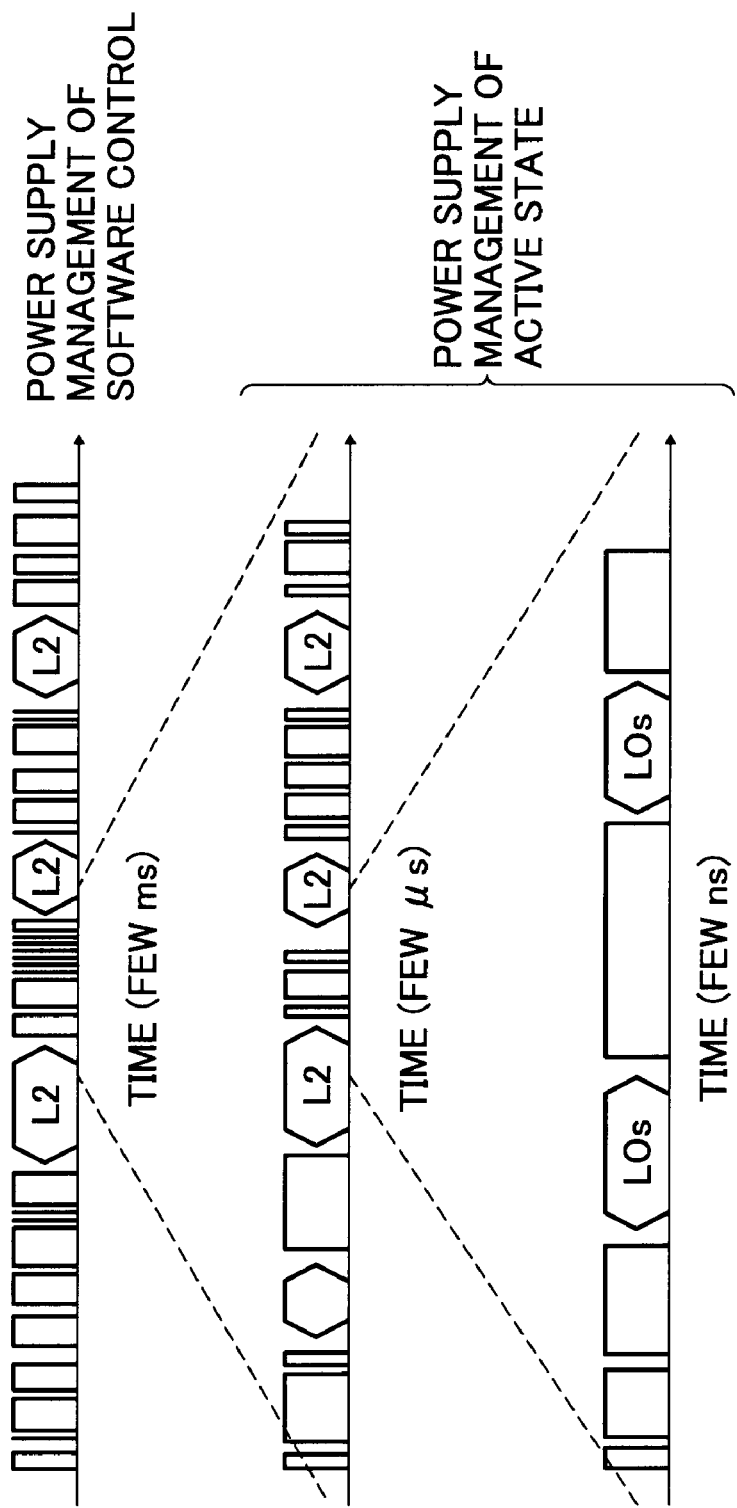
FIG. 15 is a timing chart of a control example of power supply management of an active state.

Power consumption changes to low power consumption from L0s to L2, when L0 is in the normal mode. However, it takes time to return to L0. As shown in FIG. 15, power consumption can be minimized by positively carrying out power supply management of an active state, in addition to the power management by software.

D. Physical Layer-electric Sub-block 157

A main role of the electric sub-block of the physical layer 155 is to transmit data serialized by the logical sub-block 156 to the lane, and to receive the data from the lane, and deliver the data to the logical sub-block 156.

a. AC Coupling

At the link transmission side, a capacitor for the AC coupling is mounted. With this arrangement, the DC common mode voltage at the transmission side and the DC common mode voltage at the reception side do not need to be the same. Therefore, different designs, different semiconductor processes, and different power supply voltages can be used at the transmission side and the reception side, respectively.

b. De-emphasis

In the PCI Express, although a continuation of "0" or "1" is avoided as far as possible by the 8 byte/10 byte encoding, as described above, "0" or "1" continues in some cases (at five times as a maximum). In this case, it is prescribed that a de-emphasis transfer needs to be carried out at the transmission side. When bits of the same polarity continue, noise margin of the signal received at the reception side needs to be gained, by dropping a differential voltage level (amplitude) of the second and subsequent bits, respectively by 3.5±0.5 bytes. This is called de-emphasis. Because of frequency dependency attenuation of a transmission path, changing bits have many high-frequency components, and the waveform at the reception side becomes small due to attenuation. On the other hand, non-changing bits have few high-frequency components, and the waveform at the reception side becomes relatively large. Therefore, de-emphasis is carried out to make the waveform constant at the reception side.

Data Communication Apparatus

Figure 16:
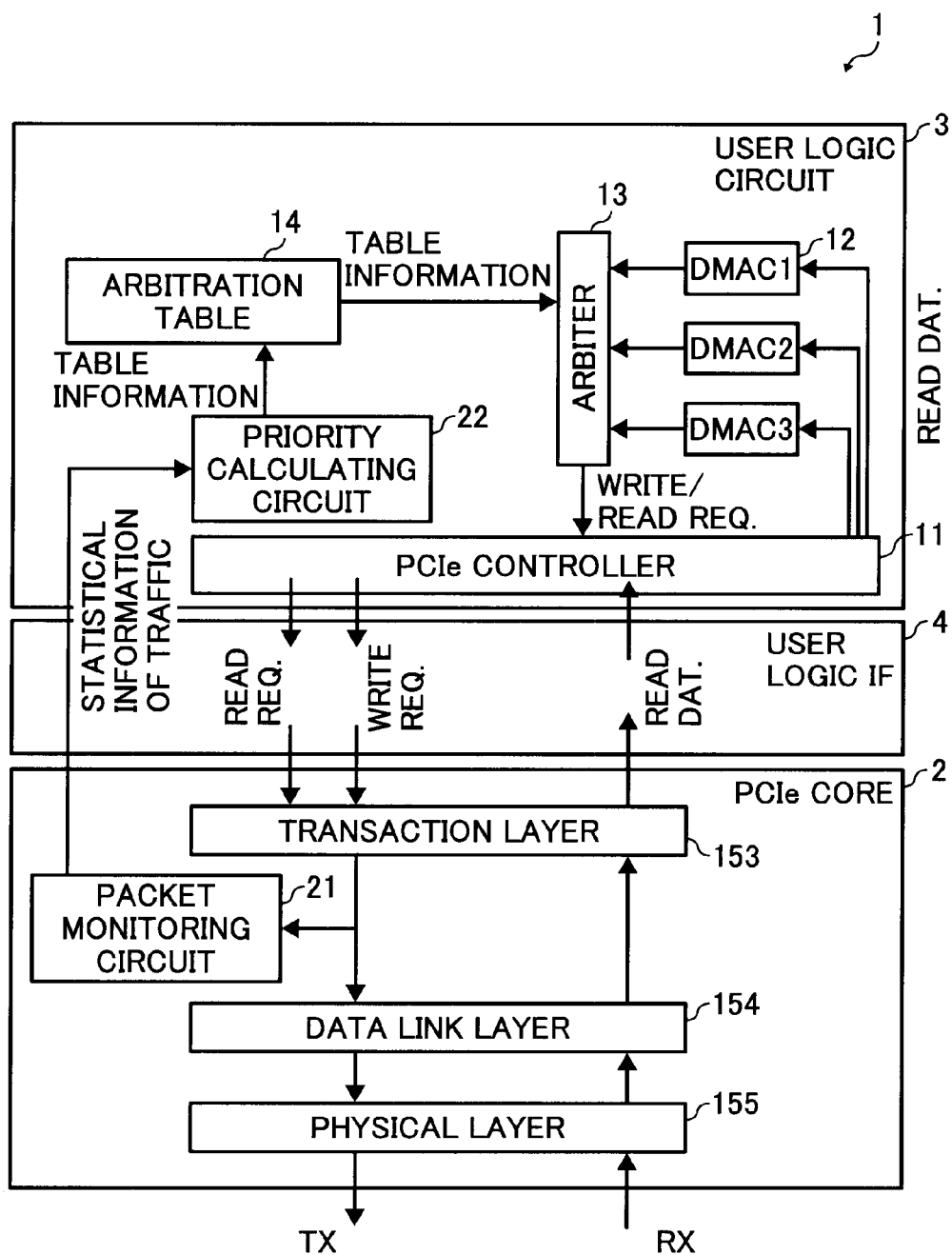
FIG. 16 is a block diagram of an outline of a data communication apparatus according to a first embodiment of the present invention.

One example of a data communication apparatus according to the first embodiment is explained below with reference to FIG. 16. FIG. 16 is a block diagram of an outline of the data communication apparatus according to the first embodiment. In the first embodiment, it is assumed that one virtual channel shares plural devices like a direct memory access (DMA) transfer. Because the virtual channel is as explained above with reference to FIG. 1, it is not explained below.

As shown in FIG. 16, a data communication apparatus 1 as a device of the PCI Express connection includes: a PCIe core 2 for the PCI Express connection; a user logic circuit 3 as a main part of the device using the PCI Express; and a user logic interface (IF) 4 that connects between the PCIe core 2 and the user logic circuit 3.

The PCIe core 2 includes the transaction layer 153 that becomes the center of the architecture of the PCI Express, the data link layer 154, and the physical layer 155, as explained above with reference to FIG. 8.

The user logic circuit 3 includes a PCIe controller 11 that arbitrates data transmitted between the PCIe core 2 and the user logic circuit 3; a direct memory access controller (DMAC) 12 that controls the DMA transfer; an arbiter 13 that exhibits the arbitration function; and an arbitration table 14.

The DMAC 12 has plural DMA channels (DMAC 1 to 3 in FIG. 16). Each channel is occupied by one device (or a chip). Data becoming a communication master via the DMAC 12 is connected to the PCIe controller 11 via the arbiter 13.

The arbiter 13 arbitrates data from the DMA channels (DMAC 1 to 3 in FIG. 16) of the DMAC 12, following the arbitration table 14, and outputs the data to the PCIe controller 11.

The algorithm of the arbiter 13 and the arbitration table 14 are explained in detail below. The arbitration table 14 stores weight information of a Weighted Round Robin (WRR) algorithm. The WRR algorithm arbitrates a data transmission quantity, based on weight information set in each port, when a contention occurs in the data transfer from each input port, at the time of outputting data input from plural input ports to output ports of a smaller number than the number of input ports (one output port at the time of outputting data to the serial bus).

For example, when the following arbitration table 14 is set, and also when plural DMA channels (DMAC 1 to 3) of the DMAC 12 issue continuous requests, the arbiter 13 issues the requests in the order of DAMC 1 to DAMC 2 to DMAC 3 to DMAC 1 to DMAC 2 to DMAC 3, and so on.

|        | Weight |
|--------|--------|
| DMAC 1 | 1      |
| DMAC 2 | 1      |
| DMAC 3 | 1      |

When the following arbitration table 14 is set, and also when plural DMA channels (DMAC 1 to 3 in FIG. 16) of the DMAC 12 issue continuous requests, the arbiter 13 issues the requests in the order of DAMC 1 to DAMC 2 to DMAC 3 to DMAC 2 to DMAC 3 to DMAC 3 to DAMC 1 to DAMC 2 to DMAC 3 to DMAC 2 to DMAC 3 to DMAC 3, and so on, with weights put on the requests at a ratio of DMAC 1:DMAC 2:DMAC 3=1:2:3.

|        | Weight |
|--------|--------|
| DMAC 1 | 1      |
| DMAC 2 | 2      |
| DMAC 3 | 3      |

When the arbiter 13 according to the WRR is provided in the user logic circuit 3 as described above, the setting of the arbiter 13 does not match the priority of the actual traffic in some cases, depending on buffers provided in the transaction layer 153 of the PCIe core 2 and kinds of traffics from the DMAC 12.

In the first embodiment, a monitored result of the packet data output from the transaction layer 153 of the PCIe core 2 is reflected in the arbitration table 14. With this arrangement, priority can be put to the packet data corresponding to the data transmission quantity of the packet data actually transferred on the serial communication path.

More specifically, a packet monitoring circuit 21 as a statistical-information generating unit is provided on the path after the packet data becomes serial, after the exit of the transaction layer 153 of the PCIe core 3. The packet monitoring circuit 21 generates statistical information of the traffic, and transmits the statistical information to the user logic circuit 3. The user logic circuit 3 includes a priority calculating circuit 22 as a weight-information updating unit that stores reference information for updating the value of the arbitration table 14.

The operation of the packet monitoring circuit 21 is explained first.

The DMA channels (DMAC 1 to 3 in FIG. 16) of the DMAC 12 put identifications ID to the issued request packets, respectively. The PCIe controller 11 allocates traffic classes, different for respective identifications of the DMAC 12, to the request packets issued from the arbiter 13. For example, the PCIe controller allocates TC1 to the request packet of the DMAC 1, allocates TC2 to the request packet of the DMAC 2, and allocates TC3 to the request packet of the DMAC 3.

A TC number is added to the packet data output from the transaction layer 153 of the PCIe core 2. The packet monitoring circuit 21 counts the number of times of issuance of request packets for each TC, and outputs the count value of each TC as statistical information to the priority calculating circuit 22.

As the statistical information of the packet monitoring circuit 21, an integrated value of the length field of the data transfer request packet can be used, in addition to the number of times of the issuance of the request packets for each TC. The length field is a part of the header information of the data transfer request packet, and is an area that includes information indicating a data transfer quantity requested by the request. In this case, a ratio of the data size of the request packet becomes statistical information, and is effective as statistical information of the data transfer quantity when the request size issued by the DMAC 12 is not constant or when the data size requested for each channel of the DMAC 12 is biased.

In the example shown in FIG. 16, the packet monitoring circuit 21 is provided at the outside of the transaction layer 153 of the PCIe core 2. Because a transmission buffer is present in the transaction layer 153 of the PCIe core 2, there is a possibility that the effect of arbitration by the arbiter 13 is lost by the transmission buffer. Priority can be set corresponding to the data transfer quantity of the packet actually transferred on the serial communication path, by reflecting the monitor packet of the output of the transaction layer 153, in the arbitration table 14.

The operation of the priority calculating circuit 22 is explained next. The priority calculating circuit 22 stores ratios of the data transfer rates required by the DMA channels (DMAC 1 to 3 in FIG. 16) of the DMAC 12. Values in the arbitration table 14 are updated by comparing ratios of the reference information to the statistical information (count values of each TC) from the packet monitoring circuit 21. An example is explained below.

When the reference information stored in the priority calculating circuit 22 is DMAC 1:DMAC 2:DMAC 3=1:2:3, and also when the statistical information from the packet monitoring circuit 21 is TC1:TC2:TC3=1:1:2, the values (weighted information) of the DMA 2 and DMA 3 in the arbitration table 14 are increased. On the other hand, when the statistical information from the packet monitoring circuit 21 is TC1:TC2:TC3=3:2:3, where the ratio of TC1 is larger than that of the reference information, the value (weight information) of DMAC 1 in the arbitration table 14 is decreased.

By repeating the above process, when an arbiter is provided in each device at the time of sharing plural devices in one virtual channel, the ratio of the data transfer rate of the DMA channels (DMAC 1 to 3 in FIG. 16) of the DMAC 12 is set as the reference information of the priority calculating circuit 22. With this arrangement, priority can be arbitrated while maintaining consistency of the setting of the arbiter and the priority of the actual traffic.

As explained above, according to the first embodiment, a monitored result of the packet data output from the transaction layer 153 constituting the architecture of the PCI Express is feedback-controlled in real time and is reflected in the arbitration table 14. With this arrangement, priority can be set corresponding to the data transfer quantity of the packet data actually transferred on the serial communication path. As a result, even when a transmission buffer of the transaction layer 153 is present, priority can be arbitrated while maintaining consistency of the setting of the arbiter 13 and the priority of the actual traffic.

A second embodiment of the present invention is explained next with reference to FIG. 17. Constituent elements identical with those in the first embodiment are denoted with like reference numerals, and their explanations will be omitted.

The second embodiment is different from the first embodiment in that a second packet monitoring circuit 31 is provided in the user logic circuit 3, in addition to the configuration of the first embodiment.

Figure 17:
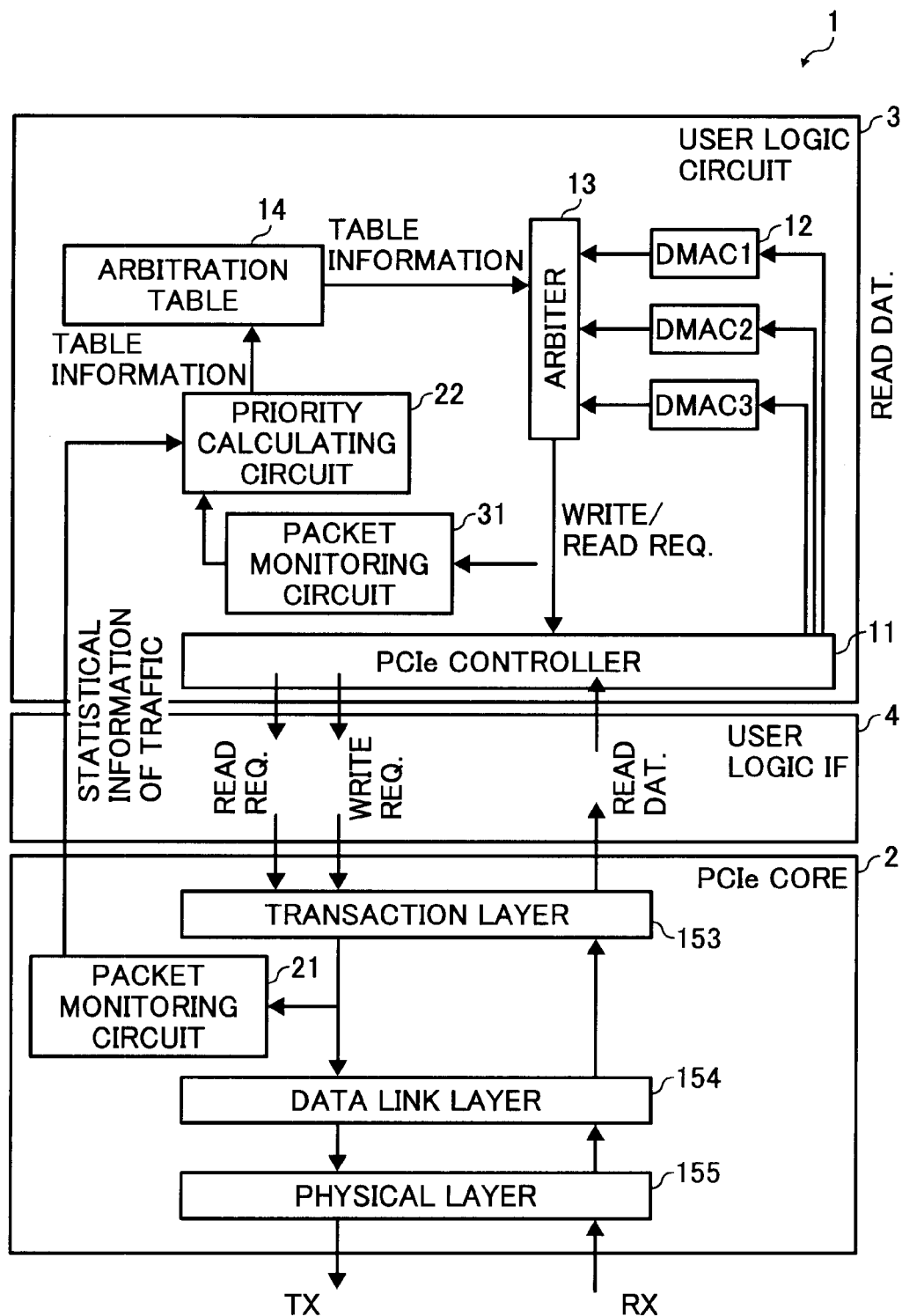
FIG. 17 is a block diagram of an outline of a data communication apparatus according to a second embodiment of the present invention.

FIG. 17 is a block diagram of an outline of the data communication apparatus 1 according to the second embodiment. As shown in FIG. 17, in the data communication apparatus 1 according to the second embodiment, the second packet monitoring circuit 31 as a second statistical-information generating unit is provided in the output of the arbiter 13. In this case, as statistical information of the second packet monitoring circuit 31, a number of times of the issuance of requests for each DMAC ID or an integration value of the request data size is output.

The priority calculating circuit 22 updates the values of the arbitration table 14 so as not to interrupt the communications of a low-priority device due to an excessively high priority placed on a high-priority device, based on the statistical information of the traffic generated by the second packet monitoring circuit 31.

As explained above, according to the second embodiment, it is possible to prevent the interruption of the communications of a low-priority device due to an excessively high priority placed on a high-priority device.

A third embodiment of the present invention is explained next with reference to FIG. 18. Constituent elements identical with those in the first and second embodiments are denoted with like reference numerals, and their explanations will be omitted.

The third embodiment is different from the first embodiment in that a buffer monitoring circuit 41 is provided in the output from the transaction layer 153 of the PCIe core 2, in addition to the configuration of the first embodiment.

Figure 18:
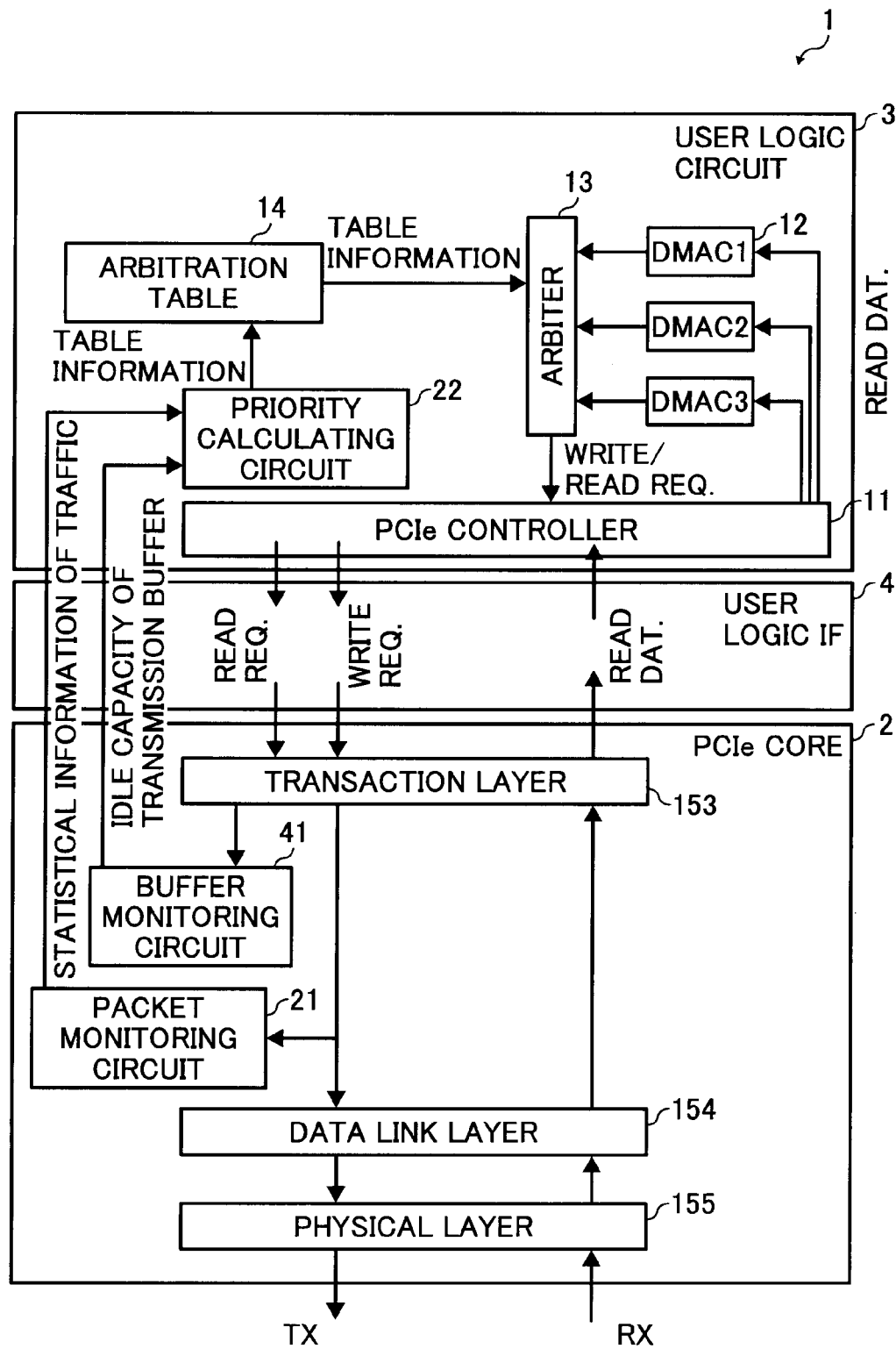
FIG. 18 is a block diagram of an outline of a data communication apparatus according to a third embodiment of the present invention.

FIG. 18 is a block diagram of an outline of the data communication apparatus 1 according to the third embodiment. As shown in FIG. 18, in the data communication apparatus 1 according to the third embodiment, the buffer monitoring circuit 41 as a buffer monitoring unit is provided in the output from the transaction layer 153 of the PCIe core 2. The buffer monitoring circuit 41 monitors an idle capacity of the transmission buffer in the transaction layer 153 of the PCIe core 2. The idle capacity of the buffer is detected for the posted request buffer and the non-posted request buffer according to the PCI Express standard, respectively. The idle capacity of the posted request buffer indicates an acceptance permission amount of the write request. The idle capacity of the non-posted request buffer indicates an acceptance permission amount of the read request. The posted request requires a response from the request issue source. In the present embodiment, the posted request means a memory-read request which causes a data response to be generated. The non-posted request does not require a response from the request issue source. In the present embodiment, the non-posted request means a memory-write request which does not cause a response to be generated from the request issue source, after transmission of the data together with the request.

The operation of the priority calculating circuit 22 according to the third embodiment is explained next. The priority calculating circuit 22 stores whether each of the DMA channels (DMAC 1 to 3 in FIG. 18) of the DMAC 12 issues a read request or a write request.

The priority calculating circuit 22 sets a smaller weight value of the write DMAC in the arbitration table 14, when the idle capacity of the posted request buffer in the transaction layer 153 of the PCIe core 2 becomes smaller, based on the idle capacities of the posted request buffer and the non-posted request buffer input from the buffer monitoring circuit 41. When the idle capacity of the non-posted request buffer in the transaction layer 153 of the PCIe core 2 becomes smaller, the weight value of the read DMAC in the arbitration table 14 is set smaller.

On the other hand, the priority calculating circuit 22 sets a larger weight value of the write DMAC in the arbitration table 14, when the idle capacity of the posted request buffer in the transaction layer 153 of the PCIe core 2 becomes larger. When the idle capacity of the non-posted request buffer in the transaction layer 153 of the PCIe core 2 becomes larger, the weight value of the read DMAC in the arbitration table 14 set larger.

By repeating the above process, the arbiter 13 can arbitrate the data transfer so as not to excessively issue the read request and the write request in a biased state.

When the IF for the request transmission in the PCIe core 2 is shared by the read request and the write request, this circuit can carry out the arbitration. Even when the requests from each DMAC are biased in time, there is an effect of preventing the interruption of the issue of other requests due to a full transmission buffer.

As explained above, according to the third embodiment, it is possible to prevent the issue of other requests from being interrupted due to a buffer filled with request packets more than necessary.

While the third embodiment has been explained as an application example to the first embodiment, there is no problem with applying the third embodiment to the second embodiment.

According to an aspect of the present invention, a monitored result of the packet data output from the transaction layer constituting the architecture of a high-speed serial bus is reflected in the arbitration table by feedback-controlling, in real time, the monitored result of the packet data. With this arrangement, even when a transmission buffer of the transaction layer is present, priority can be arbitrated while maintaining consistency of the setting of the arbiter and the priority of the actual traffic.

According to anther aspect of the present invention, packet data can be issued in a weighted frequency following the arbitration table optionally assignable to each virtual channel.

According to still another aspect of the present invention, statistical information of the traffic can be securely generated based on the quantity of the packet data transferred on the serial communication path.

According to still another aspect of the present invention, a ratio of the data sizes of a request packet becomes statistical information. This statistical information of the data transfer quantity is effective when the data size requested for each channel is biased.

According to still another aspect of the present invention, weight information of the arbitration table can be securely updated.

According to still another aspect of the present invention, it is possible to suppress the interruption of communication of a low-priority device due to an excessively high priority placed on the high-priority device.

According to still another aspect of the present invention, statistical information of the traffic can be securely generated based on the quantity of the packet data transferred on the serial path.

According to still another aspect of the present invention, a ratio of the data sizes of a request packet becomes statistical information. This statistical information of the data transfer quantity is effective when the data size requested for each channel is biased.

According to still another aspect of the present invention, it is possible to prevent the interruption of the issue of other requests due to a buffer filled with request packets more than necessary.

According to still another aspect of the present invention, high-speed output and simultaneous transfer of image data can be performed by effectively using a high-speed serial bus of the PCI Express standard having characteristics of high scalability, even when there is a timing restriction of a line synchronous transfer.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data communication circuit comprising:
a receiving unit that receives data via a serial bus;
an arbiter that arbitrates the received data by using an arbitration table to obtain arbitrated data;
an outputting unit that outputs the arbitrated data to the serial bus;
a statistical-information generating unit that is provided on one serial path at an output of a transaction layer constituting architecture of the serial bus, and that generates statistical information about a traffic based on a quantity of packet data transferred on the one serial path; and
a weight-information updating unit connected to the statistical-information generating unit, that receives the statistical information from the statistical-information generating unit, and that updates weight information of the arbitration table based on the statistical information generated by the statistical-information generating unit,
wherein the statistical-information generating unit generates the statistical information based on the quantity of the packet data which is indicated by information included in a length field of a data transfer request packet output from the transaction layer.

2. The data communication circuit according to claim 1, wherein the arbitration table stores therein weight information of an Weighted Round Robin (WRR) algorithm.

3. The data communication circuit according to claim 1, wherein the statistical-information generating unit counts number of times when packet data is issued for each traffic class allocated to packet data output from the transaction layer, and sets a count value of each traffic class as the statistical information.

4. The data communication circuit according to claim 1, wherein the weight-information updating unit compares reference information of data transfer rates required by communication masters with statistical information from the statistical-information generating unit, and updates values in the arbitration table.

5. The data communication circuit according to claim 1, further comprising a second statistical-information generating unit that is provided in the output of the arbiter, and that generates statistical information about a traffic based on a quantity of packet data transferred on the serial communication path, wherein the weight-information updating unit updates values of the arbitration table so as not to interrupt the communications of a low-priority device due to an excessively high priority placed on a high-priority device, based on the statistical information of the traffic generated by the second statistical-information generating unit.

6. The data communication circuit according to claim 5, wherein the second statistical-information generating unit counts number of times when packet data is issued for each traffic class allocated to the packet data output from the arbiter, and sets a count value of each traffic class as the statistical information.

7. The data communication circuit according to claim 5, wherein the second statistical-information generating unit calculates an integrated value of a length field value of a data transfer request packet output from the arbiter, and sets a ratio of data size of the request packet as the statistical information.

8. The data communication circuit according to claim 1, further comprising a buffer monitoring unit that is provided on a serial communication path via a transaction layer constituting architecture of the high-speed serial bus, and that monitors idle capacity of a posted request buffer and a non-posted request buffer of the transaction layer, wherein the weight-information updating unit that updates weight information of the arbitration table based on the idle capacity monitored by the buffer monitoring unit such that read requests and write requests are not over issued.

9. The data communication circuit according to claim 1, wherein the high-speed serial bus is of PCI Express standard.

10. An arbitration method to be realized on a data communication circuit that receives data via one serial bus, comprising:

arbitrating the received data with an arbiter by using an arbitration table to obtain arbitrated data;

outputting the arbitrated data to the serial bus;

generating statistical information about a traffic based on a quantity of packet data transferred on one serial path at an output of a transaction layer constituting architecture of the serial bus; and updating weight information of the arbitration table based on the statistical information generated at the generating, wherein the generating generates the statistical information based on the quantity of the packet data which is indicated by information included in a length field of a data transfer request packet output from the transaction layer.

11. The arbitration method according to claim 10, wherein the arbitration table stores therein weight information of an Weighted Round Robin (WRR) algorithm.

12. The arbitration method according to claim 10, wherein the generating includes counting number of times when packet data is issued for each traffic class allocated to packet data output from the transaction layer, and setting a count value of each traffic class as the statistical information.

13. The arbitration method according to claim 10, wherein the updating includes comparing reference information of data transfer rates required by communication masters with statistical information obtained at the generating, and updating values in the arbitration table.

14. The arbitration method according to claim 10, further comprising second generating including generating statistical information of traffics based on a quantity of packet data output from the arbiter and transferred on the serial communication path, wherein the updating includes updating values of the arbitration table so as not to interrupt the communications of a low-priority device due to an excessively high priority placed on a high-priority device, based on the statistical information of the traffic generated at the second generating.

15. The arbitration method according to claim 14, wherein the second generating includes counting number of times when packet data is issued for each traffic class allocated to the packet data output from the arbiter, and setting a count value of each traffic class as statistical information.

16. The arbitration method according to claim 14, wherein the second generating includes calculating an integration value of a length field value of a data transfer request packet output from the arbiter.

17. The arbitration method according to claim 10, further comprising monitoring an idle capacity of each of a posted request buffer and a non-posted request buffer in a transaction layer constituting architecture of the high-speed serial bus, wherein the updating includes updating values of the arbitration table to prevent a read request and a write request from being excessively issued in bias, based on the idle capacities of the posted request buffer and the non-posted request buffer respectively input at the monitoring.

* * * * *